3,637,647
WATER-INSOLUBLE MONOAZO DYESTUFFS CONTAINING A QUINOLINE COUPLING COMPONENT
Konrad Opitz, Frankfurt am Main, Germany, assignor to Farbwerke Hoechst Aktiengesellschaft vormals Meister Lucius & Bruning, Frankfurt am Main, Germany
No Drawing. Filed June 3, 1970, Ser. No. 43,187
Claims priority, application Germany, June 11, 1969, P 19 29 573.9
Int. Cl. C09b 29/36; D06p 1/02
U.S. Cl. 260—155                              8 Claims

ABSTRACT OF THE DISCLOSURE

A water-insoluble monoazo dyestuff of the formula

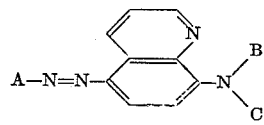

wherein A as a radical of a diazo component represents dichloro-phenylene, dinitro-phenylene, cyano-nitro-phenylene, chloro-nitro-phenylene, nitro-trifluoromethyl-phenylene, chloro-dinitro-phenylene, bromo-dinitro-phenylene, chloro-nitro-cyano-phenylene, bromo-nitro-carbomethoxy-phenylene, bromo-cyano-phenylene, methylsulfonyl-nitro-phenylene, dinitro-trifluoromethyl-phenylene or dinitro-carbomethoxy-phenylene, B represents hydrogen or lower alkyl, and C represents hydrogen, phenyl, lower alkyl-phenylene, chloro-phenylene, benzyl, cyclohexyl, hydroxyethyl, cyanoethyl, hydroxypropyl or n-butan-3-onyl, said dyestuff being suitable for the dyeing or printing of cellulose acetate or synthetic polyamide or polyester fibres, the dyeings or prints being distinguished by very good fastness properties to thermofixation, washing, rubbing, waste gas and light.

---

The present invention relates to new water-insoluble monoazo dyestuffs of the general Formula 1

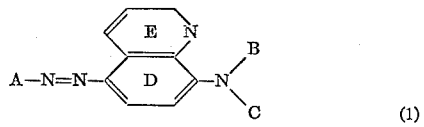

in which A represents a radical of a diazo component of the benzene or naphthalene series which may be substituted by halogen atoms and/or alkyl, alkoxy, perfluoroalkyl, alkyl-sulfonyl, aryl-sulfonyl, carbalkoxy, carbonamido, cyano or nitro groups, for example chlorine or bromine atoms or methyl, ethyl, methoxy, ethoxy, trifluoromethyl, methylsulfonyl, phenyl-sulfonyl, carbomethoxy or carbo-ethoxy groups, B stands for a hydrogen atom or an alkyl radical, which may be substituted by halogen atoms and/or hydroxy, cyano, alkoxy, acyl, acyloxy or carbalkoxy groups, C is a hydrogen atom or a lower alkyl radical, a cyclo-alkyl, aralkyl or aryl radical being free from carboxylic or sulfonic acid groups, but which may be substituted by halogen atoms and/or hydroxy, cyano, alkoxy, acyl, acyloxy or carbalkoxy groups, and D and E, being free from carboxylic or sulfonic acid groups, may be substituted by halogen atoms and/or hydroxy, alkyl, alkoxy or acylamino groups. The present invention relates further to a process for the manufacture of these water-insoluble monoazo dyestuffs, which comprises diazotizing amines of the general Formula 2

A—NH$_2$                                   (2)

in which A is as defined above, and combining them with coupling components of the general Formula 3

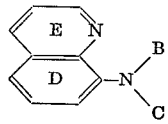

in which B, C, D and E are as defined above.

For preparing the new dyestuffs there are used as diazo components of the general formula A—NH$_2$ advantageously aniline derivatives being free from water-solubilizing groups such as carboxylic or sulfonic acid groups. Suitable examples are:

2,4-dinitro-aniline,
2-cyano-4-nitro-aniline,
2-chloro-4-nitro-aniline,
2-cyano-4-nitro-6-chloro-aniline,
2-cyano-4-nitro-6-bromo-aniline,
2-carbomethoxy-4-nitro-6-bromo-aniline,
2,4-dinitro-6-chloro-aniline,
2,4-dinitro-6-bromo-aniline,
2,5-dichloro-aniline,
2-methyl-sulfonyl-4-nitro-aniline,
2-trifluoromethyl-4-nitro-aniline,
2,4-dinitro-6-trifluoro-methyl-aniline,
2,4-dinitro-6-carbomethoxy-aniline.

Diazotation of these aniline derivatives is carried out according to suitable known processes.

Examples of the coupling components of the aforementioned general Formula 3, used in the process of the invention and prepared according to known methods, are 8-phenylamino-quinoline,
8-(4'-methylphenylamino)-quinoline,
8-(4'-chlorophenylamino)-quinoline,
8-β-cyano-ethylamino-quinoline,
8-β-hydroxy-ethylamino-quinoline,
8-N-ethyl-N-β-cyano-ethylamino-quinoline,
8-cyclohexylamino-quinoline,
8-benzylamino-quinoline, and
8-n-butane-3-onylamino-quinoline.

The coupling reaction is advantageously carried out in an aqueous medium, and it may be advantageous to eliminate the acid excess resulting from the diazotation by adding acid-binding agents, such as sodium acetate, sodium hydrogen carbonate, sodium or potassium carbonate or sodium hydroxide solution. The dyestuffs so obtained are water-insoluble and separate in the form of crystals. They may be isolated for example by filtration. The dyestuffs are then advantageously washed with water to eliminate electrolytes.

By using preparations containing the new dyestuffs in a finely divided form as well as a dispersing agent, there are obtained on synthetic fibres, such as cellulose-acetate and polyamide fibres, especially on polyester fibres, for example polyethyleneglycol-terephthalate fibres, prints and dyeings of high colour intensity and a very good build-up, which have excellent fastness properties to processing and to use. They excel especially by their very good fastnesses to thermofixation, washing, waste gas, rubbing and light.

For the dyeing of polyester fibres, the new dyestuffs are advantageously used as a granulate or a powder or as a liquid preparation ready for pouring. They are suited for dyeings from aqueous baths at temperatures higher than 100° C. under pressure or at about 100° C. in the presence of carriers, as well as for the Thermosol process, in which polyester fibre woven or knitted fabrics are padded with suspensions of the new dyestuffs, dried at temperatures below 100° C. and exposed for a short time to temperatures of from about 180° to 280° C. The new dyestuffs are very well suited further for the dyeing of fibre mixtures containing polyester fibres. When, for example, polyester/wool mixtures are dyed, the wool portion is only superficially dyed, so that this dyeing can be easily removed by a reduction after-treatment or a washing with an emulsifier.

Further, the new dyestuffs are highly appropriate also for the dyeing of polyester fibres from organic solvents; halogenated hydrocarbons having a boiling range of from 100° to 180° C., preferably of from 110° to 150° C., for example perchloroethylene, are especially suitable in this case. From solutions of the new dyestuffs in perchloroethylene, dyeings are obtained on polyester fibres at boiling temperatures which excel by their high colour intensity and by the same fastnesses to processing and to use as obtained with usual dyeing methods.

For printing polyester fibre material, the new dyestuffs are applied in the form of water containing preparations which contain, besides the finely divided dyestuff, suitable thickeners, for example carbomethoxy cellulose or locust bean flour preparations or mixtures of these substances, and fixation accelerators. Fixation is carried out by steaming for 30 to 60 minutes under atmospheric pressure or by steaming for 10 to 30 minutes under increased pressure up to 2 atmospheres gauge. Fixation may also be carried out by the action of hot air at a temperature of from 180° to 220° C. during 30 to 90 seconds.

The following examples illustrate the invention. Parts and percentages are by weight unless otherwise stated, the relation of parts by weight to parts by volume being the same as of a kilogram to a litre.

EXAMPLE 1

163 parts of 2-cyano-4-nitro-aniline are stirred with 750 parts of glacial acetic acid, partly dissolved and then, while cooling, diazotized at room temperature with 324 parts of 40%-nitrosyl-sulfuric acid, which are slowly added dropwise. A clear solution is resulting which is stirred for another hour at room temperature. This diazo solution is fed, while stirring, into a solution of 220 parts of 8-phenylamino-quinoline in 250 parts of glacial acetic acid, 200 parts by volume of 5 N hydrochloric acid and 1000 parts of water, which contains further 1000 parts of ice. While the diazo solution is fed in, further 2000 parts of ice are added in portions.

Subsequently, the pH of the solution is adjusted to 4 by adding 650 parts of sodium acetate. The coupling process is completed after a short time. The dyestuff precipitated in the form of crystals is suction-filtered and the filter cake is washed with water until it is free from electrolytes. After the drying at 60° C., 376 parts of a dyestuff of the formula

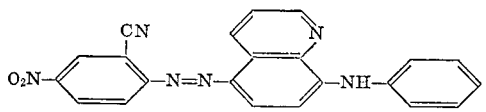

are obtained which, in a finely divided form, on polyester fibres yields clear and intense violet dyeings having very good fastnesses to light and to thermofixation.

EXAMPLE 2

217.5 parts of 2,4-dinitro-6-chloro-aniline are introduced into 740 parts of concentrated sulfuric acid and slowly combined at room temperature, while stirring and cooling, with 324 parts of 40%-nitrosyl-sulfuric acid. A clear solution results which is stirred for another hour at room temperature. The diazo solution so obtained is fed, while thoroughly stirring, into a solution of 234 parts of 8-(4'-methylphenylamino)-quinoline in 400 parts by volume of 5 N hydrochloric acid and 500 parts of water, which further contains 3000 parts of ice. Coupling is complete after a short time. The reaction mixture is stirred for another 2 hours and the dyestuff precipitated in the form of crystals is isolated by suction-filtration and washing with water until the filter cake is free from electrolytes. After the drying at 60° C., 435 parts of a dyestuff of the formula

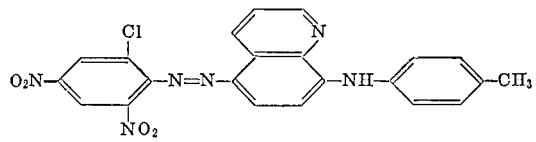

are obtained. This dyestuff, in a finely divided form yields on polyester fibres clear blue dyeings having very good fastnesses to light and to thermofixation.

EXAMPLE 3

262 parts of 2,4-dinitro-6-bromo-aniline are introduced into 740 parts of concentrated sulfuric acid and slowly combined at room temperature, while stirring and cooling, with 324 parts of 40%-nitrosyl-sulfuric acid. A clear solution results which is stirred for another hour at room temperature. The diazo solution so obtained is fed, while thoroughly stirring, into a solution of 220 parts of 8-N-phenylamino-quinoline in 400 parts by volume of 5 N hydrochloric acid and 500 parts of water, which further contains 3000 parts of ice. Coupling is completed after a short time. The reaction mixture is stirred for another 2 hours and the dyestuff precipitated in the form of crystals is isolated by suction-filtration and washing with water until the filter cake is free from electrolytes. After the drying at 60° C., 465 parts of a dyestuff of the formula

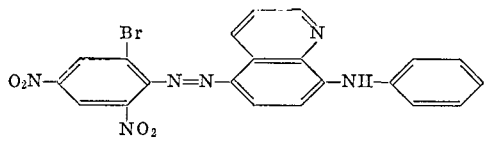

are obtained which, in a finely divided form, yields on polyester fibres reddish navy-blue dyeings having very good fastnesses to light and to thermofixation.

EXAMPLE 4

217.5 parts of 2,4-dinitro-6-chloro-aniline are introduced into 740 parts of concentrated sulfuric acid and slowly combined at room temperature, while stirring and cooling, with 324 parts of 40%-nitrosyl-sulfuric acid. A clear solution results which is stirred for another hour at room temperature. The diazo solution so obtained is fed, while thoroughly stirring, into a solution of 226 parts of 8-(cyclo-hexylamino)-quinoline in 400 parts by volume of 5 N hydrochloric acid and 500 parts of water, which further contains 3000 parts of ice. Coupling is completed after a short time. The reaction mixture is stirred for another 2 hours and the dyestuff precipitated in the form of crystals is isolated by suction-filtration and washing with water until the filter cake is free from electrolytes. 410 parts of a dyestuff of the formula

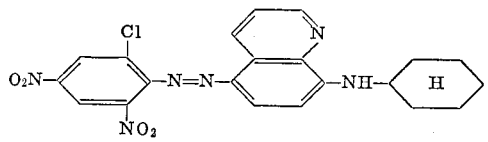

are obtained which, in a finely divided form, yields on polyester fibres intense navy-blue dyeings of very good fastnesses to light and to thermofixation.

EXAMPLE 5

163 parts of 2-cyano-4-nitraniline are stirred with 750 parts of glacial acetic acid, partly dissolved and then diazotized at room temperature, while cooling, with 324 parts of 40%-nitrosyl-sulfuric acid, which are slowly added dropwise. A clear solution results which is stirred for another hour at room temperature. This diazo solution is fed, while stirring, into a solution of 197 parts of 8-β-cyano-ethylamino-quinoline in 250 parts of glacial acetic acid, 200 parts by volume of 5 N hydrochloric acid and 1000 parts of water, which contains further 1000 parts of ice. While the diazo solution is fed in, further 2000 parts of ice in portions are added.

Subsequently, the pH of the solution is adjusted to 4 by adding 650 parts of sodium acetate. Coupling is complete after a short time. The dyestuff precipitated in the form of crystals is suction-filtered and the filter cake is washed with water until it is free from electrolytes. After the drying at 60° C. 342 parts of a dyestuff of the formula

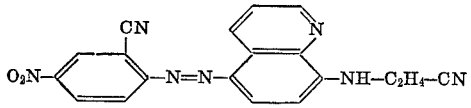

are obtained which, in a finely divided form, yields on polyester fibres violet dyeings having excellent fastnesses to light and to thermofixation.

When the diazo components listed in column 1 of the following table are diazotized according to one of the methods described in the aforementioned examples or another suitable method, and when they are coupled, optionally while eliminating the acid excess resulting from the diazotation by adding an acid-binding agent, with the coupling components listed in column 2, then dyestuffs are obtained which, in a finely divided form, on polyester fibres yield dyeings having the shades given in column 3 and having generally the same good fastnesses as in the examples cited.

prints having very good fastnesses to thermofixation, to washing, rubbing and to light are obtained.

EXAMPLE 41

When using in Example 3 instead of 262 parts of 2,4-dinitro - 6 - bromo - aniline 217.5 parts of 2,4 - dinitro-6-chloro-aniline and proceeding for the rest as described in Example 3, 420 parts of the dyestuff of the formula

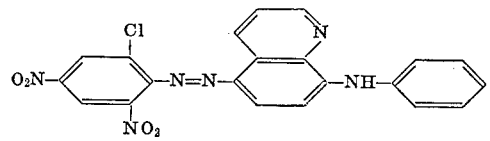

of Example 7 are obtained which, from a solution in perchloroethylene at boiling temperature, yields on polyester fibres intense blue dyeings having very good fastnesses to thermofixation and to light.

We claim:
1. A water-insoluble monoazo dyestuff of the formula

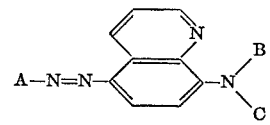

wherein A as a radical of a diazo component represents dichloro-phenylene, dinitro-phenylene, cyano-nitro-phenylene, chloro-nitro-phenylene, nitro-trifluoromethyl-phenylene, chloro-dinitro-phenylene, bromo-dinitro-phenylene, chloro - nitro - cyano - phenylene, bromo - nitro-carbome-

TABLE

| Example No. | Diazo component | Coupling component | Shade on polyester fibres |
|---|---|---|---|
| 6 | 2,4-dinitro-aniline | 8-phenylamino-quinoline | Reddish violet. |
| 7 | 2,4-dinitro-6-chloro-aniline | do | Reddish navy blue. |
| 8 | 2-cyano-4-nitro-6-chloro-aniline | do | Navy blue. |
| 9 | 2-carbomethoxy-4-nitro-6-bromo-aniline | do | Violet. |
| 10 | 2-chloro-4-nitro-aniline | 8-(4'-methylphenylamino)-quinoline | Do. |
| 11 | 2,4-dinitro-aniline | do | Bluish violet. |
| 12 | 2-cyano-4-nitro-aniline | do | Reddish blue. |
| 13 | 2,4-dinitro-6-bromo-aniline | do | Blue. |
| 14 | 2,5-dichloro-aniline | do | Red. |
| 15 | 2,4-dinitro-6-chloro-aniline | 8-benzylamino-quinoline | Bluish violet. |
| 16 | 2,4-dinitro-aniline | 8-cyclohexylamino-quinoline | Violet. |
| 17 | 2-cyano-4-nitro-aniline | do | Do. |
| 18 | 2,4-dinitro-6-bromo-aniline | do | Navy blue. |
| 19 | 2,4-dinitro-6-chloro-aniline | 8-amino-quinoline | Violet. |
| 20 | do | 8-(n-butano-3-on-yl)-amino-kuinoline | Reddish blue. |
| 21 | 2-cyano-4-nitro-aniline | do | Reddish violet. |
| 22 | 2,4-dinitro-6-chloro-aniline | 8-(4'-chloro-phenylamino)-quinoline | Reddish blue. |
| 23 | 2,4-dinitro-6-bromo-aniline | do | Do. |
| 24 | 2-cyano-4-nitro-aniline | do | Violet. |
| 25 | 2-nitro-4-trifluoro-methyl-aniline | 8-benzylamino-quinoline | Red-brown. |
| 26 | 2-trifluoro-methyl-4-nitro-aniline | do | Bluish red. |
| 27 | 2,4-dinitro-aniline | 8-N-ethyl-N-β-cyano-ethylamino-quinoline | Reddish violet. |
| 28 | 2-cyano-4-nitro-aniline | do | Do. |
| 29 | 2,4-dinitro-6-chloro-aniline | do | Reddish blue. |
| 30 | 2,4-dinitro-aniline | 8-β-cyano-ethylamino-quinoline | Bluish red. |
| 31 | 2,4-dinitro-6-bromo-aniline | do | Bluish violet. |
| 32 | do | do | Do. |
| 33 | 2,4-dinitro-6-chloro-aniline | 8-β-hydroxy-ethylamino-quinoline | Navy blue. |
| 34 | 2,4-dinitro-aniline | 8-γ-hydroxypropylamino-quinoline | Reddish violet. |
| 35 | 2-cyano-4-nitro-aniline | do | Violet. |
| 36 | 2,4-dinitro-6-chloro-aniline | do | Reddish blue. |
| 37 | 2-cyano-4-nitro-aniline | 8-n-butane-3-onylamino-quinoline | Reddish violet. |
| 38 | 2,4-dinitro-6-chloro-aniline | do | Bluish violet. |
| 39 | 2-cyano-4-nitro-aniline | 8-β-phenyethylamino-quinoline | Violet. |

EXAMPLE 40

The dyestuff of the formula

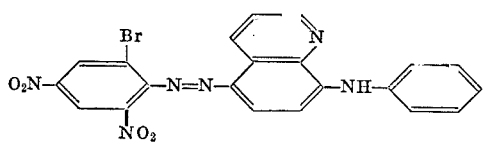

obtained according to the method described in Example 3 is applied in a water containing preparation which contains, besides the finely divided dyestuff, a dispersing agent, a thickener such as carboxymethyl cellulose and a fixation accelerator, according to usual processes for the printing of polyester fibre materials. Intense navy-blue thoxy - phenylene, bromo - cyano - phenylene, methylsulfonyl - nitro-phenylene, dinitro-trifluoromethyl-phenylene or dinitro-carbomethoxy-phenylene, B represents hydrogen or lower alkyl, and C represents hydrogen, phenyl, lower alkyl-phenylene, chloro-phenylene, benzyl, cyclohexyl, hydroxyethyl, cyanoethyl, hydroxypropyl or n-butan-3-onyl.

2. The water - insoluble monoazo dyestuff of the formula

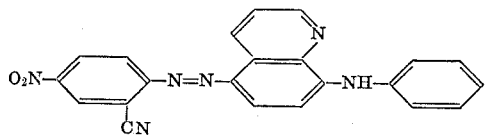

3. The water-insoluble monoazo dyestuff of the formula

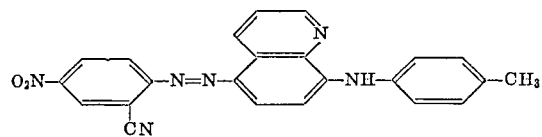

4. The water-insoluble monoazo dyestuff of the formula

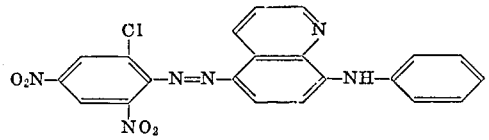

5. The water-insoluble monoazo dyestuff of the formula

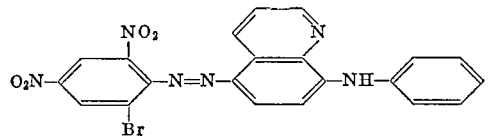

6. The water-insoluble monoazo dyestuff of the formula

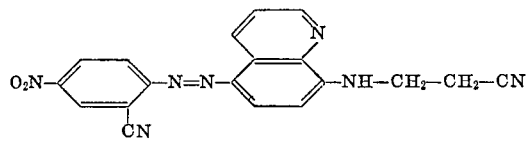

7. The water-insoluble monoazo dyestuff of the formula

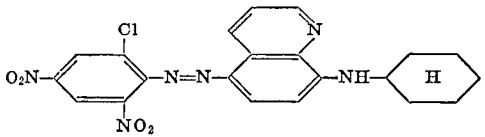

8. The water-insoluble monoazo dyestuff of the formula

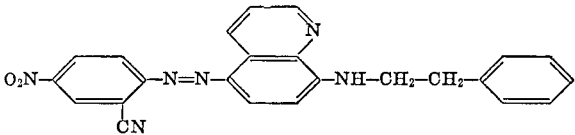

References Cited
FOREIGN PATENTS
800,144  8/1958  Great Britain _____ 260—155

CHARLES B. PARKER, Primary Examiner
D. M. PAPUGA, Assistant Examiner

U.S. Cl. X.R.
8—178, 179; 260—288 A